United States Patent
Cohen et al.

(10) Patent No.: US 11,423,097 B2
(45) Date of Patent: Aug. 23, 2022

(54) UTILIZING REINFORCEMENT LEARNING FOR GOAL ORIENTED WEBSITE NAVIGATION

(71) Applicant: PayPal, Inc., San Jose, CA (US)

(72) Inventors: Yaeli Cohen, Tel Aviv (IL); Adam Cohen, Ramat Gan (IL); Yarden Raisken, Tel Aviv (IL)

(73) Assignee: PayPal, Inc, San Jose, CA (US)

( * ) Notice: Subject to any disclaimer, the term of this patent is extended or adjusted under 35 U.S.C. 154(b) by 346 days.

(21) Appl. No.: 16/533,270

(22) Filed: Aug. 6, 2019

(65) Prior Publication Data

US 2021/0042367 A1    Feb. 11, 2021

(51) Int. Cl.
*G06F 7/00* (2006.01)
*G06F 16/951* (2019.01)
*G06N 20/00* (2019.01)
*G06N 5/04* (2006.01)

(52) U.S. Cl.
CPC ............. *G06F 16/951* (2019.01); *G06N 5/04* (2013.01); *G06N 20/00* (2019.01)

(58) Field of Classification Search
CPC ......... G06F 16/951; G06N 20/00; G06N 5/04

USPC .................................................. 707/600–899
See application file for complete search history.

(56) References Cited

U.S. PATENT DOCUMENTS

| | | | |
|---|---|---|---|
| 6,917,925 B2 | 7/2005 | Berenji et al. | |
| 8,943,008 B2 | 1/2015 | Ponulak et al. | |
| 2008/0104113 A1 | 5/2008 | Wong et al. | |
| 2011/0252050 A1* | 10/2011 | Palleti | G06F 16/955 707/769 |
| 2016/0026713 A1* | 1/2016 | Katic | G06F 16/24578 707/709 |

FOREIGN PATENT DOCUMENTS

CN         103621025 B         8/2016

* cited by examiner

*Primary Examiner* — Isaac M Woo
(74) *Attorney, Agent, or Firm* — Haynes and Boone, LLP

(57) ABSTRACT

A computer system receives a goal for an environment, wherein the environment corresponds to at least one webpage. The computer system receives one or more classifiers corresponding to the environment, wherein the one or more classifiers provide information corresponding to a current webpage and information corresponding to one or more previous actions taken by a web crawler. The computer system identifies a recommended next action based on the one or more classifiers. The computer system transmits the recommended next action to the web crawler to cause the web crawler to perform the recommended next action.

20 Claims, 5 Drawing Sheets

US 11,423,097 B2

UTILIZING REINFORCEMENT LEARNING FOR GOAL ORIENTED WEBSITE NAVIGATION

TECHNICAL FIELD

The present disclosure relates to reinforcement learning, and more particularly to utilizing reinforcement learning techniques in conjunction with a web crawler to perform goal-oriented website navigation.

BACKGROUND

The web represents a large source of data that is utilized by many companies in developing meaningful insights for the purposes of risk assessment, marketing, as well as other business purposes. In many cases, companies rely on machine learning algorithms to extract these meaningful insights from data that has been collected. Specifically, reinforcement learning is an area of machine learning concerned with how software agents take actions in an environment in order to maximize a reward. Furthermore, specific areas of machine learning, such as reinforcement learning, have been utilized in some arenas such as gaming, however, the application of reinforcement learning techniques to many other areas are unexplored. A system for the utilization of reinforcement learning in other arenas, such as with regard to developing meaningful insights from web data is needed and would provide valuable and informative information to companies all around the world.

DETAILED DESCRIPTION

Figure 1:
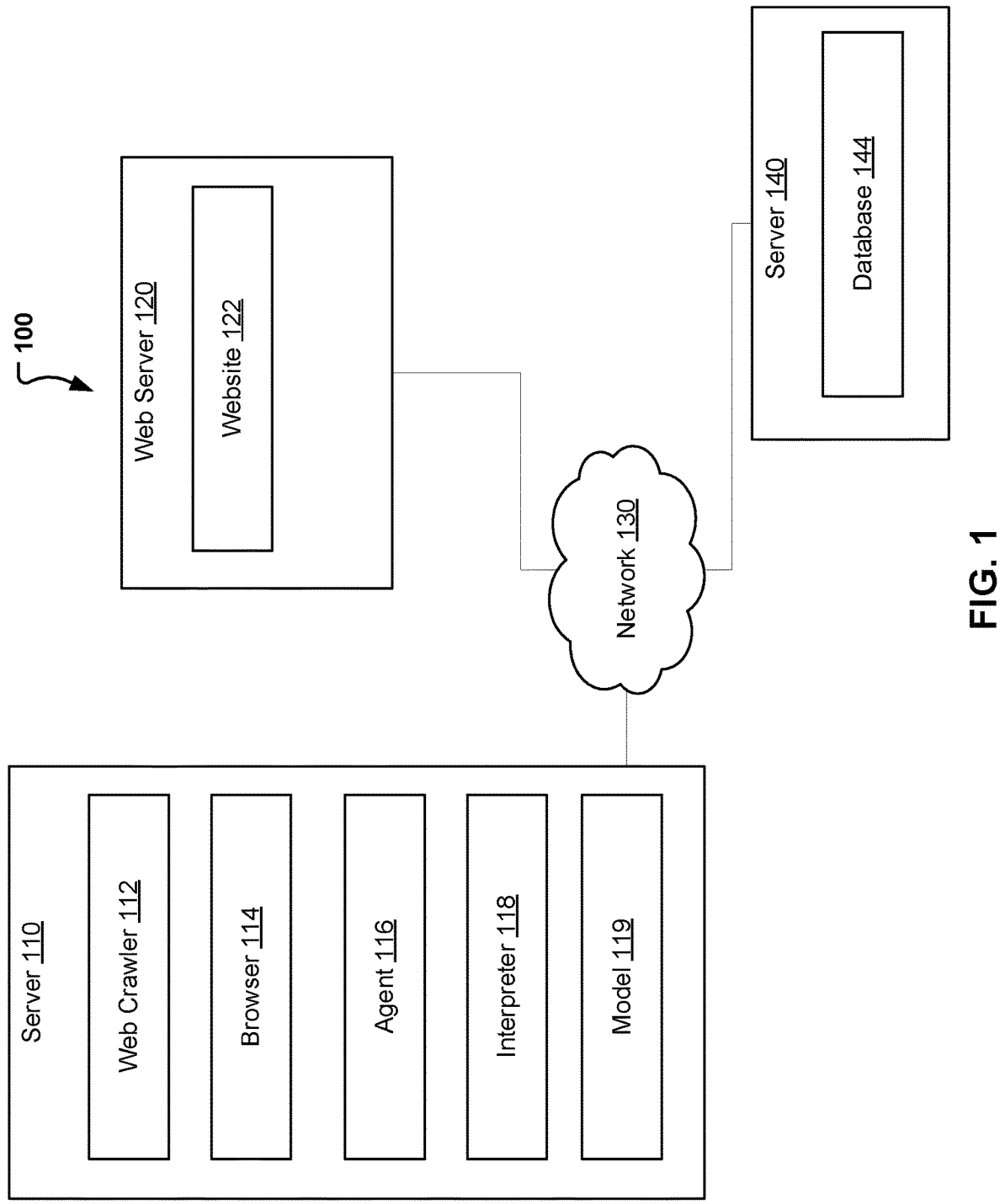
FIG. 1 illustrates a reinforcement learning system, in accordance with an embodiment.

Embodiments of the present disclosure provide a system, method, and program product. A computer system receives a goal for an environment, wherein the environment corresponds to at least one webpage. The computer system receives one or more classifiers corresponding to the environment, wherein the one or more classifiers provide information corresponding to a current webpage and information corresponding to one or more previous actions taken by a web crawler. The computer system identifies a recommended next action based on the one or more classifiers. The computer system transmits the recommended next action to the web crawler to cause the web crawler to perform the recommended next action.

Furthermore, a computer system receives a goal corresponding to a website, wherein the web site comprises of one or more webpages. The computer system receives one or more classifiers corresponding to the website, wherein the one or more classifiers provide information corresponding to a current webpage and information corresponding to one or more previous actions taken by a web crawler. The computer system determines a next action for the web crawler based on analyzing the one or more classifiers. The computer system causes the web crawler to perform the determined next action.

In the example embodiment, the present disclosure describes a solution that includes an agent application receiving a goal from an interpreter application, and further receives additional information such as a classifier corresponding to a current website/webpage and/or state information corresponding to the current webpage. Furthermore, the solution may include inputting the classifier/state information into a model to identify one or more potential actions to take in order to accomplish the stated goal. The agent application may analyze the one or more potential actions and based on a reward associated with each of the one or more potential actions, the agent application may identify an action to transmit to a web crawler.

Furthermore, the present disclosure also describes a solution that includes an interpreter application transmitted a goal to the agent application, and further determining a classifier/state information corresponding to a current website/webpage. Furthermore, in one or more embodiments, the interpreter application may identify transmit the classifier to the agent application. In addition, the solution includes detecting an action taken by a web crawler application, and based on the action, determining whether or not to provide the agent application with a reward. Upon detection that the stated goal has been reached, based on analyzing an associated classifier, the solution includes transmitting a termination signal to the agent application.

In one or more embodiments, prior to the above, a training process may occur which includes training a model (model 119), and further training/updating one or more classifiers. For example, during training, agent 116 may instruct web crawler 112 to traverse webpages that may not result in a maximization of rewards in order to gain a full understanding of an environment (and the mapping between state information of specific webpages and associated rewards). Furthermore, as webpages are traversed by web crawler 112, information may be extracted which may be utilized to update model 119 and also update one or more classifiers. In the example embodiment, a classifier may provide information corresponding a state of the environment that may be usable by agent 116 to interpret the current webpage/environment. In other words, with regard to updating one or more classifiers, interpreter 118 may analyze information (such as state information) associated with a collection of webpages and utilize the collection of information to determine generalized information to associate with one or more classifiers. For example, with regard to a plurality of product listing pages, the plurality of product listing pages may be associated with different platforms, different marketplaces, and/or different merchants. Therefore, certain elements of the pages may be specific to the merchant/marketplace/platform. By way of comparison across pages corresponding to the classifier, interpreter 118 may determine one or more generalized elements to associate with the classifier so, for a future webpage, if the one or more generalized elements are identified as present, interpreter 118 may determine that the associated classifier corresponds to the webpage (or the one or more elements on the webpage). In other words, when a future webpage is accessed, the state of the environment (webpage information, etc.) may be evaluated by interpreter 118, which may then determine one or more classifiers that may provide useful information with regard to the state of the environment (that may be usable by agent 116). In addition, in one or more embodiments, along with the providing information with regard to the current webpage (such as the type of website, type of current webpage, if a digital shopping cart present on the page includes any items), classifiers may also be used to provide information with regard to previous actions that have been taken by web crawler 112 (such as the number of clicks/actions taken so far, number of clicks/actions taken on the current webpage, a webpage type of the last visited webpage, information as to if a product page has been visited, etc.). In the example embodiment, interpreter 118 may map classifiers (via training as described above) to specific information that may be informative for agent 116 (with regard to determining a next action).

Furthermore, via traversing webpages during training, model 119 may be trained so that it is able to more accurately provide information that may allow agent 116 to identify paths and potential rewards associated with one or more potential actions. In one or more embodiments, during training, model 119 may log the state of the environment and reward received in order to learn the mapping between state information and rewards.

As stated above, Embodiments of the present disclosure will now be described in detail with reference to the accompanying Figures.

FIG. 1 illustrates reinforcement learning system 100, in accordance with an embodiment. In the example embodiment, reinforcement learning system 100 includes server 110, web server 120 and server 140 interconnected via network 130.

In the example embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a Bluetooth network, a local area network (LAN), or a wide area network (WAN). In general, network 130 can be any combination of connections and protocols that will support communications between computing devices, such as between server 110 and web server 120.

In the example embodiment, web server 120 includes website 122. In the example embodiment, web server 120 may be a desktop computer, a laptop computer, a tablet computer, a mobile device, a handheld device, a thin client, or any other electronic device or computing system capable of receiving and sending data to and from other computing devices, such as server 110, via network 130. Although not shown, optionally, web server 120 can comprise a cluster of servers executing the same software to collectively process requests as distributed by a front-end server and a load balancer. In the example embodiment, web server 120 is a computing device that is optimized for the support of websites that reside on web server 120, such as website 122, and for the support of network requests related to websites, which reside on web server 120. Web Server 120 is described in more detail with regard to the figures.

In the example embodiment, website 122 is a collection of files including, for example, HTML files, CSS files, image files and JavaScript files. Website 122 may also include other resource files such as audio files and video files. Website 122 is described in more detail with regard to the figures.

In the example embodiment, server 140 includes database 144. In the example embodiment, server 140 may be a desktop computer, a laptop computer, a tablet computer, a mobile device, a handheld device, a thin client, or any other electronic device or computing system capable of receiving and sending data to and from other computing devices, such as server 110, via network 130. Furthermore, in the example embodiment, server 140 is a computing device that is optimized for the support of database requests that correspond to database 144. Although not shown, optionally, server 140 can comprise a cluster of servers executing the same software to collectively process requests as distributed by a front-end server and a load balancer. Server 140 is described in more detail with regard to the figures.

In the example embodiment, database 144 is a database that includes information corresponding to one or more webpages. For example, database 144 may include information corresponding a web page visited by web crawler 112, such as HTML source code, one or more actionable elements corresponding to the web page, additional information corresponding to the web page (such as if a digital shopping cart is empty or has an item, etc.), and previous web pages that web crawler 112 has visited (and previous actions that web crawler 112 has taken/associated rewards for the previously taken actions). Furthermore, database 144 may include goals corresponding to previous actions taken by web crawler 112 and may additionally include information corresponding to a mapping of one or more classifiers to one or more pieces of information. In other embodiments, database 144 may include user information or other types of information. Database 144 is described in more detail with regard to the figures.

In the example embodiment, server 110 includes web crawler 112, browser 114, agent 116, interpreter 118, and model 119. In the example embodiment, server 110 may be a desktop computer, a laptop computer, a tablet computer, a mobile device, a handheld device, a thin client, or any other electronic device or computing system capable of receiving and sending data to and from other computing devices, such as web server 120, via network 130. Furthermore, in the example embodiment, server 110 is a computing device that is optimized for the support of programs that reside on server 110, such as web crawler 112 and agent 116. Although not shown, optionally, server 110 can comprise a cluster of servers executing the same software to collectively process requests as distributed by a front-end server and a load balancer. Server 110 is described in more detail with regard to the figures.

In the example embodiment, browser 114 is an application that is capable of communicating with other computing devices to transmit request and a receive information. Furthermore, browser 114 is capable of displaying received information to the user of server 110. In the example embodiment, browser 114 may transmit a request to website 122, and further receive webpage information from website 122. Browser 114 is described in further detail with regard to the figures.

Web crawler 112 is a software application that is capable of browsing the interne in order to identify information corresponding to one or more web pages, such as, to the identify elements of a web page. In the example embodiment, web crawler 112 is capable of accessing one or more databases to identify one or more websites that need to be analyzed (and is further capable of storing information in one or more databases in association with one or more web pages or websites). Additionally, in the example embodiment, web crawler 112 is capable of extracting information and content from a web page, such as for example, source code corresponding to one or more elements of a web page. Furthermore, in one or more embodiments, web crawler 112 may utilize the functionality of browser 114 to access one or more websites, such as website 122. Web crawler 112 is described in further detail with regard to the figures.

In the example embodiment, model 119 is a model, such as a machine learning model/reinforcement learning model, that is capable of receiving an input and provide a corresponding output. For example, in one or more embodiments, model 119 may be capable of receiving an input corresponding to a goal and providing an output of a prediction corresponding to one or more next actions to take (by the web crawler or another application) in order to achieve the goal. Furthermore, in the example embodiment, model 119 may function in a reinforced learning environment, and may further be capable of observing an environment, such as for example activity conducted by web crawler 112 and utilizing the observed activity to determine a prediction. Model 119 is described in more detail with regard to the figures.

In the example embodiment, interpreter 118 is an application that is capable of providing information to agent 116, such as in the form of one or more classifiers associated with a state of the environment (current website/webpage), and additional information. For example, interpreter 118 may analyze a current webpage accessed by web crawler 112, and may extract information associated with the webpage, such as the uniform resource locator (URL), one or more hypertext markup language (HTML) elements (such as selectable elements on the webpage), metadata associated with the webpage (metadata may include session time, actions taken in session, browser type, etc.). Further, the extracted information (state information) may be utilized to determine one or more classifiers that may be provided to agent 116. In one or more embodiments, the state information may also include operating system information, hardware/machine information, and hardware resource information. In the example embodiment, interpreter 118 may be capable of determining a rewards scheme for reaching the goal. In addition, interpreter 118 may be capable of detecting a current webpage that has been accessed based on extracted information, and based on the webpage, determine whether or not to provide a reward to agent 116. Further, interpreter 118 may be capable of determining if a webpage that has been accessed corresponds to reaching the associated goal and based on determining that the goal has been reached, may transmit a termination signal to agent 116. Interpreter 118 is described in further detail with regard to the figures.

Agent 116 is a software application that is capable of receiving information, such as a classifier of a current webpage, and raw state information corresponding to the current webpage, and based on the received information is capable of determining an action to take. Furthermore, agent 116 is capable of transmitting the determined action to web crawler 112. In the example embodiment, agent 116 is capable of determining one or more actions towards achieving a goal and may determine the action to take based on maximizing an associated reward. Agent 116 is described in further detail with regard to the figures.

In addition, although in the example embodiment, model 119 and database 144 are depicted as being on server 110 and server 140 respectively, in other embodiments, model 119 may be located on a different server, such as server 140, and further, in other embodiments, database 144 may be located on server 110.

In the example embodiment, the steps described by the figures below may take place after the training process described above.

Figure 2:
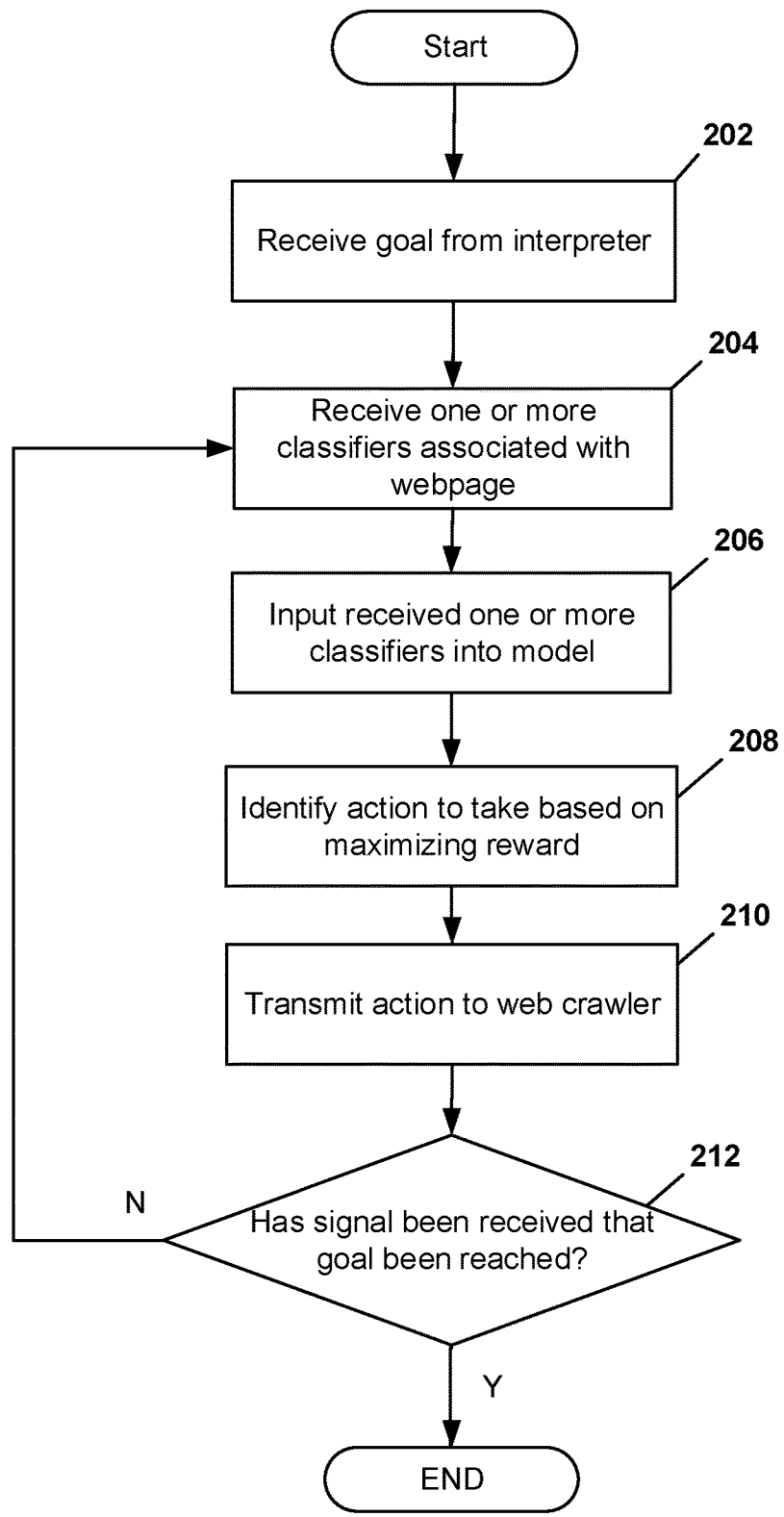
FIG. 2 is a flowchart illustrating the operations of the agent of FIG. 1 in determining an action to transmit to the web crawler of FIG. 1, in accordance with an embodiment.

FIG. 2 is a flowchart illustrating the operations of agent 116 in determining an action to transmit to web crawler 112, in accordance with an embodiment. In the example embodiment, agent 116 may receive a goal (or one or more goals) from interpreter 118 (step 202). In the example embodiment, the goal may be defined by an administrator of server 110. In one or more embodiments, an administrator of server 110 may input multiple goals to be completed, and interpreter 118 may identify a goal from the input goals. After completion of the goal, interpreter 118 may identify the next goal and transmit the goal to agent 116.

In the example embodiment, agent 116 may receive one or more classifiers corresponding to a current environment/webpage (such as webpage information, previous actions taken, etc.) (step 204). In the example embodiment, interpreter 118 may extract and identify state information associated with the environment, which as stated above may include: information associated with the webpage, such as the uniform resource locator (URL), one or more hypertext markup language (HTML) elements (such as selectable elements on the webpage), metadata associated with the webpage (metadata may include session time, actions taken in session, browser type, etc.), and/or hardware information. Interpreter 118 may then analyze the raw state information and determine one or more classifiers that correspond to the raw state information. In the example embodiment, as stated above, classifiers may be trained during a training period so that they may be mapped to information that may be informative and help agent 116 understand the current state of the environment. During training, by way of traversing a plurality of webpages/websites, interpreter 118 may analyze raw state information/metadata and other information associated with the webpage/websites and identify information that may be generalized with regard to a feature or state of information. For example, by way of training across a plurality of webpages/websites, interpreter 118 may determine a portion of raw state information (such as information present within HTML) that corresponds to a shopping cart that has an item. A classifier may then be mapped (in database 144) to the portion of raw state information so that, when a future webpage is accessed, interpreter 118 may compare extracted raw state information and compare it to the stored mapping to identify if the classifier corresponds to the webpage being accessed. In other embodiments, agent 116 may also receive the raw state information along with the one or more classifiers from interpreter 118.

In the example embodiment, agent 116 may input the received one or more classifiers and/or the raw state information associated with the current environment into model 119 (step 206). In the example embodiment, after training, model 119 may process one or more classifiers (and the state information) to identify one or more actions that may be taken by web crawler 112 to obtain potential rewards. For example, model 119 may process the classifiers (and raw state information), and based on previous training, may provide one or more actions to take and the corresponding predicted rewards for each of the one or more actions. In the example embodiment, during training, agent 116 may direct web crawler 112 to traverse down different paths within one or more environments (websites) in order to train model 119 and further help identify rewards for future environments. Therefore, based on the received classifiers, model 119 may analyze previous activity that may have occurred during training (in a similar environment or in an environment with similar classifiers) and may determine one or more actions and one or more predicted rewards that corresponds to the one or more actions.

Based on the output of model 119, agent 116 may determine an action to take in order to maximize the potential reward (step 208). In the example embodiment, model 119 may output information corresponding to one or more actions (or paths that include multiple actions) and further may output information corresponding to rewards associated with each action or path. Agent 116 may then analyze the output and determine a path/action that may correspond to a maximum reward value. In the example embodiment, agent 116 may determine a path/action that corresponds to a maximum total rewards value (while achieving the stated goal). In other embodiments, agent 116 may not only look at a total rewards value for a given path/action but may also look at the rewards in the context of present and future value. For example, if a first path corresponds to a first action followed by a second action to achieve the stated goal, with the first action corresponding to a first webpage with an associated rewards payout of 5 units and the second action corresponding to a second webpage with an associated rewards payout of 20 units, while a second path corresponds to only a third action that corresponds to a rewards payout of 20 units, agent 116 may analyze the two paths and may determine to choose the second path because (dependent on the algorithm utilized for the analysis) the current value of 5 units plus future value of 20 units may be deemed to be less valuable than the current value of 20 units.

In the example embodiment, agent 116 may transmit the determined action to web crawler 112 (step 210). In the example, web crawler 112 may take the action, and interpreter 118 may pay out an amount of rewards based on the action taken. Furthermore, interpreter 118 may then determine if the taken action has resulted in the goal being reached, and if so, agent 116 may receive a termination signal from interpreter 118 (decision 212). If agent 116 receives the terminal signal from interpreter 118 (decision 212, "YES" branch), then the process ends and interpreter 118 may identify a new goal and further transmit the goal to agent 116. In one or more embodiments, the new goal may include a new environment or may include performing the same goal or another goal in the same environment (such as the same website).

If agent 116 does not receive the termination signal from interpreter 118 (decision 212, "NO" branch), agent 116 may revert back to step 204 and receive one or more classifiers corresponding to the current environment (webpage) as described above.

In the example embodiment, model 119 and the classifiers may continue to be updated, after training, based on the activity of web crawler 112 (agent 116 and interpreter 118).

Figure 3:
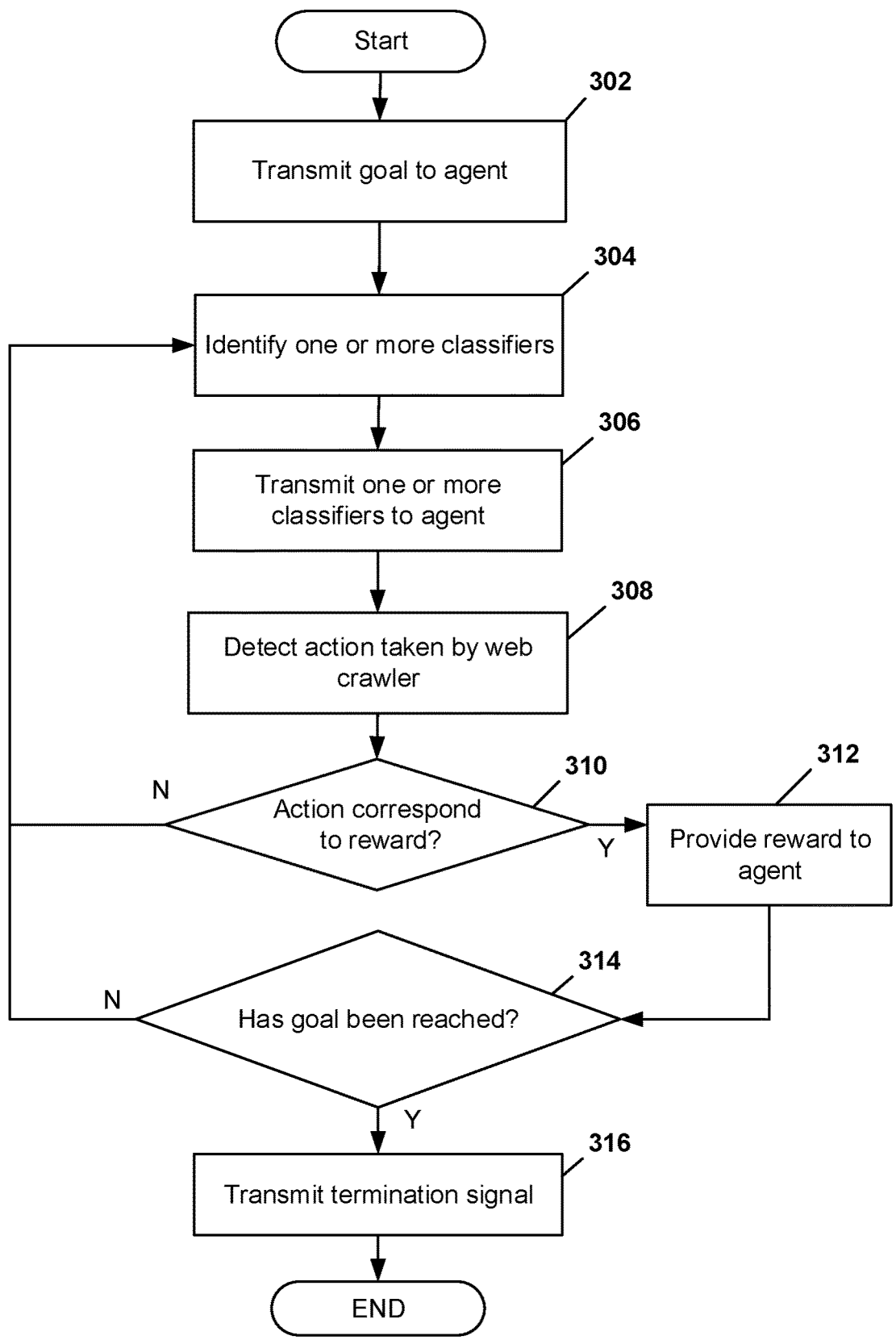
FIG. 3 is a flow diagram illustrating the operations of the interpreter of FIG. 1 in providing information to the agent of FIG. 1 and determining whether to provide rewards to the agent based on action taken by the agent, in accordance with an embodiment.

FIG. 3 is a flow diagram illustrating the operations of interpreter 118 in providing one or more classifiers representing a current environment to agent 116 and determining whether to provide rewards to the agent based on action taken by the agent, in accordance with an embodiment. In the example embodiment, interpreter 118 may transmit a goal (or one or more goals to agent 116 (step 302). In the example embodiment, as stated above, the goal (or one or more goals) may be defined by an administrator of server 110.

In the example embodiment, interpreter 118 may identify one or more classifiers corresponding to corresponding to a current environment/webpage (such as webpage information, previous actions taken, etc.) (step 304). In the example embodiment, interpreter 118 may extract and identify state information associated with the environment, which as stated above may include: information associated with the webpage, such as the uniform resource locator (URL), one or more hypertext markup language (HTML) elements (such as selectable elements on the webpage), metadata associated with the webpage (metadata may include session time, actions taken in session, browser type, etc.), and/or hardware information. As stated above, interpreter 118 may then analyze the raw state information and determine one or more classifiers that correspond to the raw state information. In the example embodiment, as stated above, classifiers may be trained during a training period so that they may be mapped to information that may be informative and help agent 116 understand the current state of the environment. For the purposes of providing examples (non-exhaustive), a classifier may detail information such as a type of website (e-commerce, blog, etc.), a type of webpage (homepage, product page, checkout page), whether a digital shopping cart contains any items, a number of clicks or actions taken so far, a number of clicks/actions taken on the current webpage, the webpage type for the last visited webpage, whether a product webpage or checkout webpage has already been visited, or additional information.

In the example embodiment, interpreter 118 may transmit the identified one or more classifiers to agent 116 (step 306). As described above, agent may input the received one or more classifiers into model 119 in order to identify a next action for web crawler 112. Once the action is identified, agent 116 may transmit the determined action to web crawler 112, which may then perform the determined action.

In the example embodiment, interpreter 118 may detect the action taken by web crawler 112 (step 308), determine if the action corresponds to a reward (decision 310). In the example embodiment, interpreter 118 may analyze state information (such as webpage information and/or metadata) to identify the webpage accessed (or action taken by web crawler 112). For example, upon a web crawler taking an action to access a product listing page, interpreter 118 may analyze the webpage information and determine that the current page is a product listing page. Interpreter 118 may then determine if the action corresponds to a reward. In the example embodiment, interpreter 118, based on the stated goal, interpreter 118 may provide rewards for certain actions that move web crawler 112 closer to achieving the stated goal. For example, for a goal of accessing a checkout page, interpreter 118 may provide rewards for actions such as accessing a product listing page, adding an item to a digital shopping cart, and accessing a checkout page. Furthermore, in the example embodiment, an administrator of server 110 may provide information as to the rewards structure or scheme, which interpreter 118 may refer to in determining an appropriate reward for an action. Therefore, a rewards payout for accessing a product listing page may vary based on the details surrounding the action. For example, in an attempt to achieve a goal of accessing a checkout page, the first time a product listing page is accessed, interpreter 118 may refer to a rewards structure and determine that the appropriate rewards payout is 4 units, however, if the product listing page is accessed again prior to the goal being achieved, interpreter 118 may provide a lesser reward or no reward. In another example, a reward payout may be dependent on efficiency. In other words, referring to the example above, if the product listing page is accessed in 3 clicks (or actions) a lesser rewards payout may be awarded to agent 116 than if the product listing page had been accessed in 2 clicks (or actions). In the example embodiment, the rewards structure is set up to incentivize agent 116 to transmit actions to web crawler 112 so that the state goal is completed or achieved in an efficient manner.

If interpreter 118 determines that the action taken by web crawler 112 does not correspond to a reward (decision 310, "NO" branch), interpreter 118 does not provide a reward and returns to step 304, identifying and providing one or more classifiers associated with the current environment to agent 116.

If interpreter 118 determines that the action taken by web crawler 112 corresponds to a reward (decision 310, "YES" branch), interpreter 118 provides or pays out the corresponding reward to agent 116 (step 312).

Furthermore, interpreter 118 may then determine if the action taken by web crawler 112 has resulted in the goal being reached (decision 314). In the example embodiment, interpreter 118 may determine if the goal has been reached via analyzing state information (webpage information, metadata, etc.) and determining if the current action has resulted in the goal being reached. For example, for a goal of accessing a checkout page, interpreter 118 may analyze webpage information for the current webpage (which may be done when determining a corresponding reward) and determine that the current webpage is the checkout page for a specific website, and therefore, the stated goal has been reached.

If interpreter 118 determines that the action taken by web crawler 112 has resulted in the goal being reached (decision 314, "YES" branch), interpreter 118 transmits a termination signal to agent 116 (step 316). In one or more embodiments, the new goal may include a new environment or may include performing the same goal or another goal in the same environment (such as the same web site).

If interpreter 118 determines that the action taken by web crawler 112 does not result in the goal being reached (decision 314, "NO" branch), the process may revert back to step 304 and interpreter 118 may identify one or more classifiers corresponding to the current environment as described above.

Figure 4:
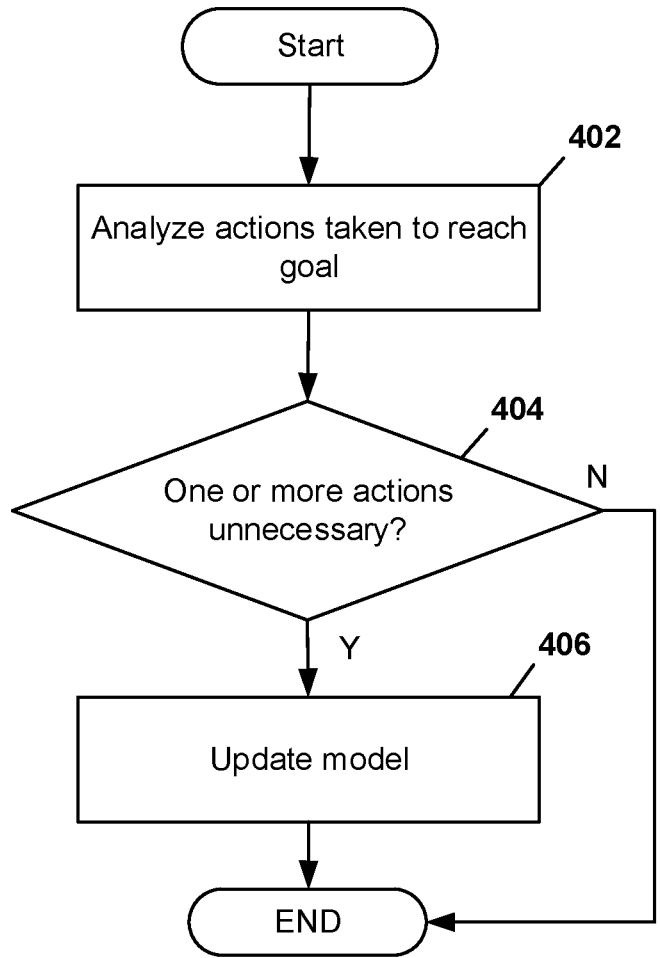
FIG. 4 is a flowchart illustrating the operations of the agent of FIG. 1 in analyzing one or more actions taken by the web crawler of FIG. 1 in achieving a goal, and further determining if actions can be taken to maximize a reward for achieving the goal, in accordance with an embodiment.

FIG. 4 is a flowchart illustrating the operations of agent 116 in analyzing one or more actions taken by web crawler 112 in achieving a goal, and further determining if actions can be taken to maximize a reward for achieving the goal, in accordance with an embodiment.

In the example embodiment, upon a goal being achieved, agent 116 may analyze the one or more actions taken to reach the goal (step 402). In the example embodiment, agent 116 may determine if one or more actions taken by web crawler 112 were unnecessary in achieving the stated goal, for example, by determining if one or more actions did not result in a reward. For example, if 4 actions were taken by web crawler 112 in accessing a checkout page of a website (the stated goal) and one of the actions corresponds to accessing a product review page (which did not result in a reward being provided to agent 116 by interpreter 118), agent 116 may determine that the action was unnecessary, and therefore, may utilize the information to update (or train) model 119 so that the action is not taken for achieving the stated goal on the next iteration (with regard to the current environment or another environment).

In the example embodiment, as described above, agent 116 may determine if one or more actions taken by web crawler 112 were unnecessary in achieving the stated goal (decision 404). If agent 116 determines that one or more actions taken by web crawler 112 were unnecessary for achieving the state goal (decision 404, "NO"), agent 116 may continue onward to identify an action to achieve a next stated goal (provided by interpreter 118).

In the example embodiment, as described above, agent 116 may determine if one or more actions taken by web crawler 112 were unnecessary in achieving the stated goal (decision 404). If agent 116 determines that one or more actions taken by web crawler 112 were unnecessary for achieving the state goal (decision 404, "YES"), agent 116 may utilize the information to update (or train) model 119 so that the action is not taken for achieving the stated goal on the next iteration (with regard to the current environment or another environment) (step 406).

The foregoing description of various embodiments of the present disclosure has been presented for purposes of illustration and description. It is not intended to be exhaustive nor to limit the disclosure to the precise form disclosed. Many modifications and variations are possible. Such modifications and variations that may be apparent to a person skilled in the art of the disclosure are intended to be included within the scope of the disclosure as defined by the accompanying claims.

Furthermore, this specification includes references to "the example embodiment," "other embodiments," "one or more embodiments," "further embodiments", "additional embodiments", and the like. The appearances of these phrases (and similar phrases) do not necessarily refer to the same embodiment. Particular features, structures, or characteristics may be combined in any suitable manner consistent with this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features.

Figure 5:
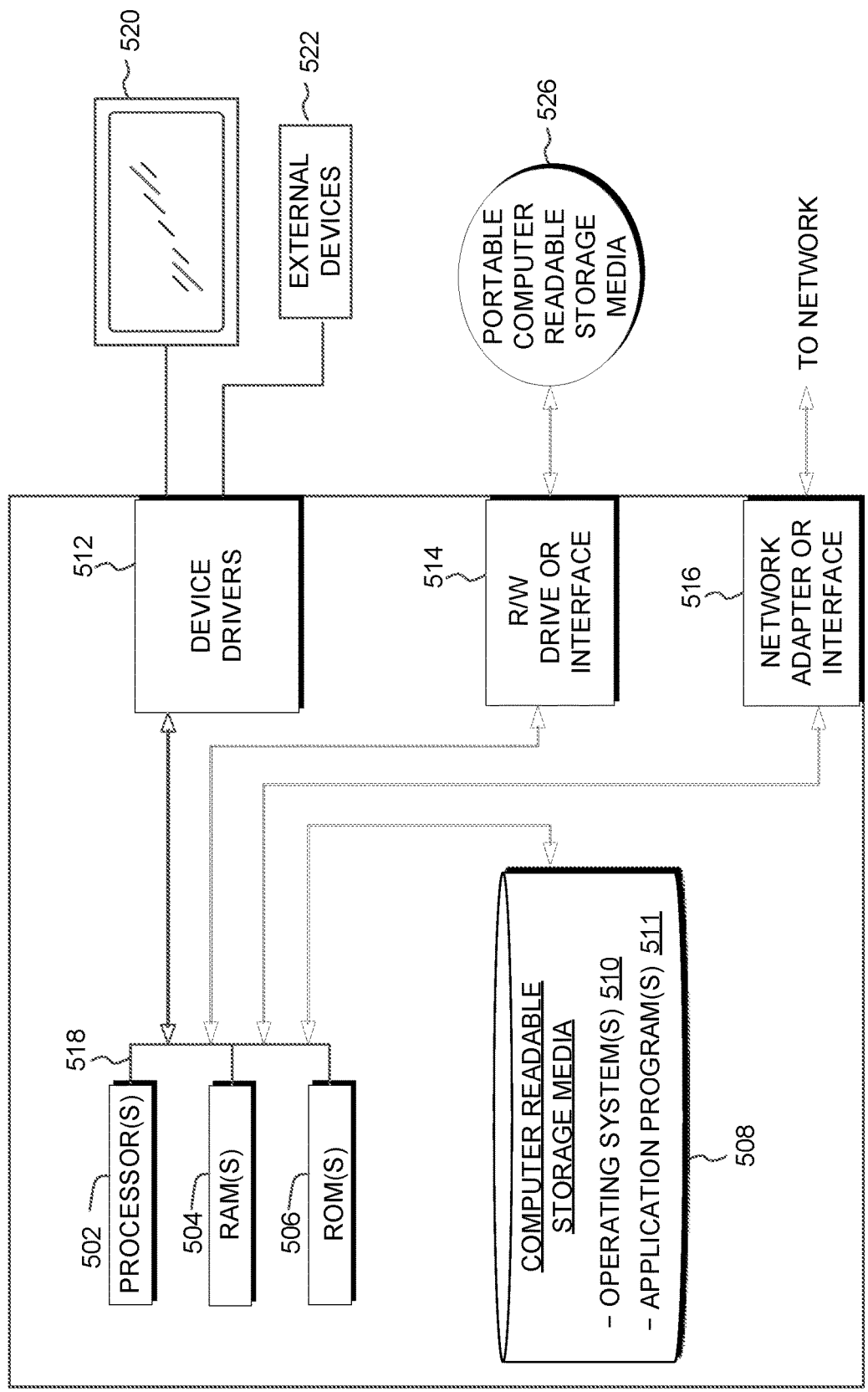
FIG. 5 is a block diagram depicting the hardware components of the reinforcement learning system of FIG. 1, in accordance with an embodiment.

FIG. 5 depicts a block diagram of components of computing devices contained in reinforcement learning system 100 of FIG. 1, in accordance with an embodiment. It should be appreciated that FIG. 5 provides only an illustration of one implementation and does not imply any limitations with regard to the environments in which different embodiments may be implemented. Many modifications to the depicted environment may be made.

Computing devices may include one or more processors 502, one or more computer-readable RAMs 504, one or more computer-readable ROMs 506, one or more computer readable storage media 508, device drivers 512, read/write drive or interface 514, network adapter or interface 516, all interconnected over a communications fabric 518. Communications fabric 518 may be implemented with any architecture designed for passing data and/or control information between processors (such as microprocessors, communications and network processors, etc.), system memory, peripheral devices, and any other hardware components within a system.

One or more operating systems 510, and one or more application programs 511, for example, web crawler 112, are stored on one or more of the computer readable storage media 508 for execution by one or more of the processors 502 and by utilizing one or more of the respective RAMs 504 (which typically include cache memory). In the illustrated embodiment, each of the computer readable storage media 508 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing devices may also include a R/W drive or interface 514 to read from and write to one or more portable computer readable storage media 526. Application programs 511 on the computing devices may be stored on one or more of the portable computer readable storage media 526, read via the respective R/W drive or interface 514 and loaded into the respective computer readable storage media 508.

Computing devices may also include a network adapter or interface 516, such as a TCP/IP adapter card or wireless communication adapter (such as a 4G wireless communication adapter using OFDMA technology). Application programs 511 on the computing devices may be downloaded to the computing devices from an external computer or external storage device via a network (for example, the Internet, a local area network or other wide area network or wireless network) and network adapter or interface 516. From the network adapter or interface 816, the programs may be loaded onto computer readable storage media 508. The network may comprise copper wires, optical fibers, wireless transmission, routers, firewalls, switches, gateway computers and/or edge servers.

Computing devices may also include a display screen 520, and external devices 522, which may include, for example a keyboard, a computer mouse and/or touchpad. Device drivers 512 interface to display screen 520 for imaging, to external devices 522, and/or to display screen 520 for pressure sensing of alphanumeric character entry and user selections. The device drivers 512, R/W drive or interface 514 and network adapter or interface 516 may comprise hardware and software (stored on computer readable storage media 508 and/or ROM 506).

The programs described herein are identified based upon the application for which they are implemented in a specific embodiment. However, it should be appreciated that any particular program nomenclature herein is used merely for convenience, and thus the disclosure should not be limited to use solely in any specific application identified and/or implied by such nomenclature.

Based on the foregoing, a computer system, method, and computer program product have been disclosed. However, numerous modifications and substitutions can be made without deviating from the scope of the present disclosure. Therefore, the various embodiments have been disclosed by way of example and not limitation.

Various embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system, comprising:
   one or more computer-readable memories storing program instructions; and
   one or more processors configured to execute the program instructions to cause the system to perform operations comprising:
   receiving one or more classifiers for an environment that corresponds to one or more webpages, wherein the one or more classifiers are trained at least in part by a machine learning process and provide information corresponding to a current webpage of the one or more webpages and information corresponding to one or more previous actions taken by a web crawler, the web crawler comprising a software application configured to extract source code corresponding to elements of the one or more webpages;
   identifying a recommended next action based on the one or more classifiers; and
   transmitting the recommended next action to the web crawler to cause the software application of the web crawler to perform the recommended next action.

2. The computer system of claim 1, the operations further comprising receiving a reward based on the software application of the web crawler performing the recommended next action.

3. The computer system of claim 1, wherein the identifying the recommended next action based on the one or more classifiers includes:
   analyzing one or more actions identified based on the one or more classifiers;
   determining a potential reward value for each of the one or more actions; and
   determining the recommended next action from the one or more actions based on determining the recommended next action corresponds to a highest potential reward value.

4. The computer system of claim 1, wherein the one or more classifiers includes information corresponding to a type of website, information corresponding to a type of webpage, information corresponding to whether a digital shopping cart contains an item, information corresponding to a number of actions taken by the web crawler, information corresponding to a number of actions taken by the web crawler on the current webpage, a webpage type for a previously visited webpage, or information corresponding to whether a specific webpage has been accessed.

5. The computer system of claim 1, the operations further comprising:
   training a machine learning model of the machine learning process based on instructing the web crawler to traverse the one or more webpages associated with one or more websites, wherein the recommended next action is identified using the machine learning model.

6. The computer system of claim 1, the operations further comprising:
   training a plurality of classifiers based on instructing the web crawler to traverse the one or more webpages associated with one or more websites, wherein the plurality of classifiers includes the one or more classifiers.

7. The computer system of claim 6, wherein the training the plurality of classifiers includes mapping each of the plurality of classifiers to information corresponding to the elements of the one or more webpages.

8. A non-transitory computer-readable medium storing computer-executable instructions, that in response to execution by one or more hardware processors, causes the one or more hardware processors to perform operations comprising:
   receiving one or more classifiers for a website that comprises one or more webpages, wherein the one or more classifiers are trained at least in part by a machine learning process and provide information corresponding to a current webpage of the one or more webpages and information corresponding to one or more previous actions taken by a web crawler, the web crawler comprising a software application configured to extract source code corresponding to elements of the one or more webpages;
   determining a next action for the web crawler based on analyzing the one or more classifiers; and
   causing the software application of the web crawler to perform the determined next action.

9. The non-transitory computer-readable medium of claim 8, the operations further comprising receiving a reward based on the software application of the web crawler performing the determined next action.

10. The non-transitory computer-readable medium of claim 8, wherein the determining the next action based on analyzing the one or more classifiers includes:
   analyzing one or more actions identified based on the one or more classifiers;

determining a potential reward value for each of the one or more actions; and determining the determined next action from the one or more actions based on determining the determined next action corresponds to a highest potential reward value.

11. The non-transitory computer-readable medium of claim 8, wherein the one or more classifiers includes information corresponding to a type of web site, information corresponding to a type of webpage, information corresponding to whether a digital shopping cart contains an item, information corresponding to a number of actions taken by the web crawler, information corresponding to a number of actions taken by the web crawler on the current webpage, a webpage type for a previously visited webpage, or information corresponding to whether a specific webpage has been accessed.

12. The non-transitory computer-readable medium of claim 8, the operations further comprising:

training a machine learning model of the machine learning process based on instructing the web crawler to traverse the one or more webpages associated with one or more websites, wherein the next action is determined using the machine learning model.

13. The non-transitory computer-readable medium of claim 8, the operations further comprising:

training a plurality of classifiers based on instructing the web crawler to traverse the one or more webpages associated with one or more websites, wherein the plurality of classifiers includes the one or more classifiers.

14. The non-transitory computer-readable medium of claim 13, wherein the training the plurality of classifiers includes mapping each of the plurality of classifiers to information corresponding to the elements of the one or more webpages.

15. A method, comprising:

transmitting, by one or more hardware processors to an agent application, an environment that includes one or more webpages;

determining, by the one or more hardware processors, one or more classifiers corresponding to the environment, wherein the one or more classifiers are trained at least in part via machine learning and provide information corresponding to a current webpage of the one or more webpages and information corresponding to one or more previous actions taken by a web crawler, the web crawler comprising a software application configured to extract source code corresponding to elements of the one or more webpages;

transmitting, by the one or more hardware processors, the one or more classifiers to the agent application;

detecting, by the one or more hardware processors, an action taken by the software application of the web crawler; and determining, by the one or more hardware processors, whether the action taken by the software application of the web crawler corresponds to a reward.

16. The method of claim 15, further comprising in response to determining that the action taken by the web crawler corresponds to a reward, providing, by the one or more hardware processors, the reward to the agent application.

17. The method of claim 15, wherein the determining the one or more classifiers corresponding to the environment comprises:

analyzing, by the one or more hardware processors, state information corresponding to a current state of the environment; and determining, by the one or more hardware processors, the one or more classifiers from a plurality of classifiers based on the one or more classifiers corresponding to one or more attributes of the state information corresponding to the current state of the environment.

18. The method of claim 15, wherein the one or more classifiers includes information corresponding to a type of website, information corresponding to a type of webpage, information corresponding to whether a digital shopping cart contains an item, information corresponding to a number of actions taken by the web crawler, information corresponding to a number of actions taken by the web crawler on the current webpage, a webpage type for a previously visited webpage, or information corresponding to whether a specific webpage has been accessed.

19. The method of claim 15, further comprising:

determining, by the one or more hardware processors, whether the action taken by the software application of the web crawler corresponds to a predefined criterion being satisfied; and in response to determining that the action taken by the web crawler corresponds to the predefined criterion being satisfied, transmitting, by the one or more hardware processors, a termination signal to the agent application.

20. The method of claim 15, wherein the determining whether the action taken by the software application of the web crawler corresponds to a reward includes determining, by the one or more hardware processors, whether information corresponding to a current webpage is associated with a reward.

* * * * *